(12) United States Patent
Peysakhovich et al.

(10) Patent No.: US 11,170,288 B2
(45) Date of Patent: Nov. 9, 2021

(54) SYSTEMS AND METHODS FOR PREDICTING QUALITATIVE RATINGS FOR ADVERTISEMENTS BASED ON MACHINE LEARNING

(71) Applicant: Facebook, Inc., Menlo Park, CA (US)

(72) Inventors: Alexander Peysakhovich, San Francisco, CA (US); Michael Randolph Corey, New York, NY (US); Neha Bhargava, San Francisco, CA (US); Hannah Siow Pavalow, Brooklyn, NY (US)

(73) Assignee: Facebook, Inc., Menlo Park, CA (US)

( * ) Notice: Subject to any disclaimer, the term of this patent is extended or adjusted under 35 U.S.C. 154(b) by 867 days.

(21) Appl. No.: 15/668,391

(22) Filed: Aug. 3, 2017

(65) Prior Publication Data

US 2019/0042919 A1    Feb. 7, 2019

(51) Int. Cl.
| | | |
|---|---|---|
| G06N 3/04 | (2006.01) | |
| G06Q 30/02 | (2012.01) | |
| G06N 20/00 | (2019.01) | |
| G06Q 50/00 | (2012.01) | |

(52) U.S. Cl.
CPC ........... *G06N 3/0472* (2013.01); *G06N 20/00* (2019.01); *G06Q 30/0202* (2013.01); *G06Q 30/0243* (2013.01); *G06Q 50/01* (2013.01)

(58) Field of Classification Search
CPC ........ G06N 3/02; G06N 3/0472; G06N 20/00; G06Q 30/0243
See application file for complete search history.

(56) References Cited

U.S. PATENT DOCUMENTS

| | | | |
|---|---|---|---|
| 9,460,451 B2 * | 10/2016 | Ruiz ...................... | G06Q 30/00 |
| 2006/0277102 A1 | 12/2006 | Agliozzo | |
| 2007/0192164 A1 | 8/2007 | Nong et al. | |
| 2011/0035272 A1 | 2/2011 | Bhatt et al. | |
| 2012/0259695 A1 | 10/2012 | Glassman | |
| 2012/0269425 A1 | 10/2012 | Marchesotti et al. | |
| 2013/0011070 A1 | 1/2013 | Datta | |
| 2013/0097011 A1 | 4/2013 | Wang | |
| 2017/0076318 A1 * | 3/2017 | Goswami ........... | G06Q 30/0276 |
| 2017/0103416 A1 | 4/2017 | Krishnan | |
| 2017/0140398 A1 | 5/2017 | Fleischman | |
| 2017/0300576 A1 | 10/2017 | Osindero et al. | |
| 2018/0137142 A1 | 5/2018 | Kiapour et al. | |
| 2018/0248995 A1 | 8/2018 | Rhoads | |
| 2019/0043073 A1 | 2/2019 | Peysakhovich | |

OTHER PUBLICATIONS

Chen, Junxuan, et al. "Deep ctr prediction in display advertising." Proceedings of the 24th ACM international conference on Multimedia. 2016. (Year: 2016).*

Langley, Pat, et al., "Approaches to Machine Learning", Department of Computer Science at Carnegie-Mellon University, Feb. 16, 1984, (Year 1984), pp. 1-28.

* cited by examiner

*Primary Examiner* — Benjamin P Geib
(74) *Attorney, Agent, or Firm* — Sheppard Mullin Richter & Hampton LLP

(57) ABSTRACT

Systems, methods, and non-transitory computer readable media can determine a representation of an advertisement based on a first machine learning model. The representation can be provided to a second machine learning model. One or more qualitative ratings associated with the advertisement can be determined based on the second machine learning model.

20 Claims, 7 Drawing Sheets

500

Train a first machine learning model based on training data including pixel data for a plurality of advertisements and associated representations of the plurality of advertisements
502

Train a second machine learning model based on training data including representations of a plurality of advertisements and associated qualitative ratings
504

SYSTEMS AND METHODS FOR PREDICTING QUALITATIVE RATINGS FOR ADVERTISEMENTS BASED ON MACHINE LEARNING

CROSS-REFERENCE TO RELATED APPLICATIONS

This application is related to U.S. patent application Ser. No. 15/668,429, filed on Aug. 3, 2017 and entitled "SYSTEMS AND METHODS FOR DETERMINING VISUALLY SIMILAR ADVERTISEMENTS FOR IMPROVING QUALITATIVE RATINGS ASSOCIATED WITH ADVERTISEMENTS", U.S. patent application Ser. No. 15/668,447, filed on Aug. 3, 2017 and entitled "SYSTEMS AND METHODS FOR PROVIDING MACHINE LEARNING BASED RECOMMENDATIONS ASSOCIATED WITH IMPROVING QUALITATIVE RATINGS", and U.S. patent application Ser. No. 15/668,497, filed on Aug. 3, 2017 and entitled "SYSTEMS AND METHODS FOR PROVIDING APPLICATIONS ASSOCIATED WITH IMPROVING QUALITATIVE RATINGS BASED ON MACHINE LEARNING", each of which is incorporated herein by reference in its entirety.

FIELD OF THE INVENTION

The present technology relates to the field of social networks. More particularly, the present technology relates to techniques for analyzing advertisements associated with social networking systems.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

A social networking system may provide resources through which users may publish content items. In one example, a content item can be presented on a profile page of a user. As another example, a content item can be presented through a feed for a user to access. In some cases, a social networking system may also provide advertisements from various entities. For example, one or more advertisements can be presented through a feed for a user.

SUMMARY

Various embodiments of the present disclosure can include systems, methods, and non-transitory computer readable media configured to determine a representation of an advertisement based on a first machine learning model. The representation can be provided to a second machine learning model. One or more qualitative ratings associated with the advertisement can be determined based on the second machine learning model.

In some embodiments, the first machine learning model is a neural network that includes a plurality of layers, and the representation of the advertisement includes a set of features determined based on the neural network.

In certain embodiments, the set of features includes an output of each neuron of a fully connected layer of a convolutional neural network.

In an embodiment, each feature of the set of features indicates a likelihood of an attribute being associated with the advertisement.

In some embodiments, a qualitative rating relates to one or more of: noticeability, a focal point, interesting information, an emotional reward, or a call-to-action (CTA).

In certain embodiments, a qualitative rating is associated with visual content of an advertisement.

In an embodiment, the second machine learning model is based at least in part on one or more of: a linear regression model, a random forest, or a neural network.

In some embodiments, the determining the representation of the advertisement includes providing pixel data for the advertisement to the first machine learning model as input.

In certain embodiments, the first machine learning model is trained based on training data including pixel data for a plurality of advertisements and associated representations of the plurality of advertisements.

In an embodiment, the second machine learning model is trained based on training data including representations of a plurality of advertisements and associated qualitative ratings.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
FIG. 1 illustrates an example system including an example advertisement qualitative rating module configured to determine qualitative ratings for advertisements, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Predicting Qualitative Ratings for Advertisements Based on Machine Learning

People use computing devices (or systems) for a wide variety of purposes. Computing devices can provide different kinds of functionality. Users can utilize their computing devices to produce information, access information, and share information. In some cases, users can utilize computing devices to interact or engage with a conventional social networking system (e.g., a social networking service, a social network, etc.). A social networking system may provide resources through which users may publish content items. In one example, a content item can be presented on a profile page of a user. As another example, a content item can be presented through a feed for a user to access.

A social networking system may also provide advertisements from various entities. For example, one or more advertisements can be presented through a feed for a user. Entities associated with advertisements may be interested in finding out whether their advertisements presented in various channels of the social networking system are effective, for example, according to various criteria. Under conventional approaches specifically arising in the realm of computer technology, entities associated with advertisements can request human reviewers to rate their advertisements as presented through the social networking system according to various criteria. However, obtaining ratings for such advertisements from human reviewers can require significant amounts of time and resources.

An improved approach rooted in computer technology can overcome the foregoing and other disadvantages associated with conventional approaches specifically arising in the realm of computer technology. Based on computer technology, the disclosed technology can determine qualitative ratings for advertisements based on machine learning techniques. For example, qualitative ratings can be provided for advertisements based on visual content of the advertisements. A machine learning model can be trained based on advertisements that have been labeled with qualitative ratings, and qualitative ratings for advertisements can be determined based on the trained machine learning model. Qualitative ratings can relate to various criteria associated with advertisements. Examples of criteria can include noticeability, a focal point, interesting information, emotional reward, and call-to-action (CTA). An advertisement can include various types of content, including visual information, and the content in an advertisement can be analyzed based on machine learning techniques to determine a representation of the advertisement. For example, an advertisement can be represented as a set of features (e.g., a feature vector). In some embodiments, content in advertisements can be analyzed based on machine learning techniques, such as machine vision or computer vision techniques. For example, a machine learning model can be trained to determine or recognize various attributes associated with advertisements, and representations of advertisements can be determined based on the trained machine learning model. In this way, the disclosed technology can automatically predict qualitative ratings for advertisements without requiring extensive human review and can provide qualitative ratings in an efficient and scalable manner. Details relating to the disclosed technology are provided below.

FIG. 1 illustrates an example system 100 including an example advertisement qualitative rating module 102 configured to determine qualitative ratings for advertisements, according to an embodiment of the present disclosure. The example advertisement qualitative rating module 102 can include an advertisement representation module 104 and an advertisement qualitative rating prediction module 106. In some instances, the example system 100 can include at least one data store 120. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the advertisement qualitative rating module 102 can be implemented in any suitable combinations. While the disclosed technology is described in connection with advertisements associated with a social networking system for illustrative purposes, the disclosed technology can apply to any other type of system and/or content. One or more machine learning models discussed in connection with the example advertisement qualitative rating module 102 can be implemented separately or in combination, for example, as a single machine learning model, as multiple machine learning models, as one or more staged machine learning models, as one or more combined machine learning models, etc.

The example advertisement qualitative rating module 102 can provide qualitative ratings for advertisements based on visual content of the advertisements. Visual content of an advertisement can include various types of information. For example, an advertisement can depict one or more objects, concepts, themes, animals, people (e.g., faces), etc. Visual content of an advertisement can be relevant in determining qualitative ratings for the advertisement. For instance, criteria associated with qualitative ratings can be based at least in part on visual content of advertisements. Examples of criteria can include noticeability, a focal point, interesting information, emotional reward, call-to-action, etc. Visual content of an advertisement can be represented or described by a representation of the advertisement. A representation of an advertisement can be determined by the advertisement representation module 104, as described below. Representations of advertisements can facilitate analysis and/or comparison of advertisements. Advertisements can be in any format, such as images, videos, etc.

The advertisement representation module 104 can determine representations of advertisements. Representations of advertisements can be determined based on machine learning techniques, such as machine vision or computer vision techniques. The advertisement representation module 104 can train a machine learning model to determine representations of advertisements. For example, the machine learning model can be trained based on training data including information associated with advertisements and corresponding labels. For example, the training data can include pixel data for the advertisements and labels associated with the advertisements. Labels can correspond to one or more attributes associated with advertisements. As used herein, attributes associated with advertisements can be referred to as "advertisement attributes". Advertisement attributes can relate to visual content of advertisements, and such attributes can be referred to as "visual attributes." Examples of visual attributes can include whether an advertisement depicts a particular object, a particular concept, a particular theme, a particular animal, a particular person or people in general, etc. In some embodiments, advertisement attributes can also relate to aspects of advertisements other than visual content, and such attributes can be referred to as "nonvisual attributes." Examples of nonvisual attributes may include metadata for advertisements or other information associated with advertisements.

The trained machine learning model can determine representations of advertisements. For instance, pixel data for an advertisement can be provided to the trained machine learning model as input, and the trained machine learning model can provide a representation of the advertisement as output. As discussed in more detail herein, the representation of the advertisement can be expressed as a feature vector in some embodiments. The advertisement representation module 104 can retrain the machine learning model based on new or updated training data if information about new advertisements becomes available.

In some embodiments, the machine learning model can include a neural network, such as a deep neural network (DNN), a convolutional neural network (CNN), etc. In general, a neural network can refer to a computational model used to determine, calculate, and/or approximate one or more functions that can depend on various inputs and that can be generally unknown. Neural networks can, in some cases, be represented as systems of interconnected nodes or elements, which can be referred to as "neurons." Neural networks can be configured to facilitate determining, calculating, computing, and/or approximating, etc., one or more values from one or more inputs. Neural networks can be adaptive and thus can be configured to perform machine learning and pattern recognition.

In certain embodiments, the neural network can correspond to a convolutional neural network. In general, a convolutional neural network can refer to a feed-forward artificial neural network in which individual neurons are tiled or configured such that the neurons respond to overlapping regions in a visual field. Convolutional neural networks can be utilized as models for image recognition and processing. The convolutional neural network can include one or more layers. For example, a convolutional neural network can include one or more convolutional layers, one or more pooling layers, one or more rectified linear unit (ReLU) layers, and one or more fully connected layers. Each layer of a convolutional neural network can build progressively more complex representations of an advertisement, for example, from pixel data to high level classifications. For instance, various layers of a convolutional neural network can extract features that can be helpful in determining qualitative ratings for advertisements. A last fully connected layer in a convolutional neural network can extract a set of features for advertisements, and the set of features can be used as representations of advertisements. Each neuron in the last fully connected layer can be a feature for advertisements, and the set of features can include values that are output for each neuron in the layer. For example, a representation of an advertisement can be a feature vector including values for the set of features for the advertisement. A number of features included in the set of features can be selected as appropriate. In some embodiments, the set of features can include 2,048 features. In certain embodiments, values for different features can be normalized such that the values can be compared across features.

Each feature included in a representation of an advertisement can be associated with an attribute for an advertisement, such as a visual attribute or a nonvisual attribute. A value for a feature can indicate a likelihood of an advertisement being associated with a corresponding attribute. In some embodiments, each feature can indicate whether an advertisement is associated with a particular category. A category can relate to an object, a concept, a theme, an animal, one or more people, etc. For instance, a last fully connected layer of a convolutional neural network can classify whether an advertisement is associated with one or more categories. In an example, pixel data for an advertisement can be provided to the trained machine learning model, and the trained machine learning model can output values for a set of features as a representation of the advertisement. A first feature can indicate whether an advertisement is associated with a category for cars. A second feature can indicate whether an advertisement is associated with a category for dogs. A third feature can indicate whether an advertisement is associated with a category for people, and so forth. A value for the first feature can indicate a likelihood of the advertisement being associated with the category for cars (e.g., including a depiction of a car). A value for the second feature can indicate a likelihood of the advertisement being associated with the category for dogs (e.g., including a depiction of a dog). A value for the third feature can indicate a likelihood of the advertisement being associated with the category for people (e.g., including a depiction of a person). Values for these features can be used in predicting one or more qualitative ratings for the advertisement, as described below. All examples herein are provided for illustrative purposes, and there can be many variations and other possibilities.

The advertisement qualitative rating prediction module 106 can predict qualitative ratings for advertisements. For example, a machine learning model can be trained to predict qualitative ratings for advertisements based on representations of the advertisements. Functionality of the advertisement qualitative rating prediction module 106 is described in more detail herein.

In some embodiments, the advertisement qualitative rating module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the advertisement qualitative rating module 102 can be, in part or in whole, implemented as software running on one or more computing devices or systems, such as on a server system or a client computing device. In some instances, the advertisement qualitative rating module 102 can be, in part or in whole, implemented within or configured to operate in conjunction or be integrated with a social networking system (or service), such as a social networking system 630 of FIG. 6. Likewise, in some instances, the advertisement qualitative rating module 102 can be, in part or in whole, implemented within or configured to operate in conjunction or be integrated with a client computing device, such as the user device 610 of FIG. 6. For example, the advertisement qualitative rating module 102 can be implemented as or within a dedicated application (e.g., app), a program, or an applet running on a user computing device or client computing system. It should be understood that many variations are possible.

The data store 120 can be configured to store and maintain various types of data, such as the data relating to support of and operation of the advertisement qualitative rating module 102. The data maintained by the data store 120 can include, for example, information relating to advertisements, representations of advertisements, qualitative ratings, machine learning models, features, features vectors, etc. The data store 120 also can maintain other information associated with a social networking system. The information associated with the social networking system can include data about users, social connections, social interactions, locations, geofenced areas, maps, places, events, groups, posts, communications, content, account settings, privacy settings, and a social graph. The social graph can reflect all entities of the social networking system and their interactions. As shown in the example system 100, the advertisement qualitative rating module 102 can be configured to communicate and/or operate with the data store 120. In some embodiments, the data store 120 can be a data store within a client computing device. In some embodiments, the data store 120 can be a data store of a server system in communication with the client computing device.

Figure 2:
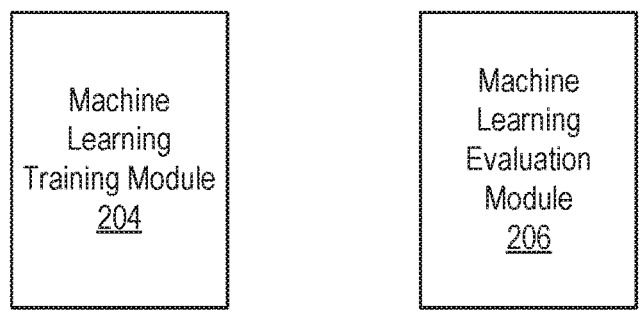
FIG. 2 illustrates an example advertisement qualitative rating prediction module configured to predict qualitative ratings for advertisements, according to an embodiment of the present disclosure.

FIG. 2 illustrates an example advertisement qualitative rating prediction module 202 configured to predict qualitative ratings for advertisements, according to an embodiment of the present disclosure. In some embodiments, the advertisement qualitative rating prediction module 106 of FIG. 1 can be implemented with the example advertisement qualitative rating prediction module 202. As shown in the example of FIG. 2, the example advertisement qualitative rating prediction module 202 can include a machine learning training module 204 and a machine learning evaluation module 206.

The machine learning training module 204 can train a machine learning model to predict qualitative ratings for advertisements. In some embodiments, as mentioned above, qualitative ratings can relate to criteria such as noticeability, a focal point, interesting information, emotional reward, and call-to-action. The noticeability qualitative rating can indicate whether or an extent to which an advertisement captures attention. The focal point qualitative rating can indicate whether or an extent to which an advertisement has a focal point. The interesting information qualitative rating can indicate whether or an extent to which an advertisement includes interesting information. The emotional reward qualitative rating can indicate whether or an extent to which an advertisement appeals emotionally. The call-to-action qualitative rating can indicate whether or an extent to which an advertisement includes a CTA. Many variations are possible. A machine learning model can be trained based on training data (e.g., labeled data) including representations of advertisements and values for qualitative ratings associated with the advertisements. For example, representations of advertisements can be determined by the advertisement representation module 104, as described above. Various types of machine learning models can be used to predict qualitative ratings. For example, the machine learning model can be a regression model (e.g., linear, nonlinear, logistic, etc.), a random forest, a neural network (e.g., a multilayer perceptrons (MLP), a DNN, a CNN, etc.), etc.

The training data for training the machine learning model can include various features. For example, the training data can include some or all of features in the set of features included in advertisement representations for advertisements. As explained above, each feature in the set of features included in a representation of an advertisement can relate to an attribute associated with the corresponding advertisement. The machine learning training module 204 can determine weights associated with various features used to train the machine learning model. The machine learning training module 204 can retrain the machine learning model based on new or updated training data. For example, if information about new advertisements becomes available, the machine learning training module 204 can train the machine learning model based on the information about new advertisements.

The machine learning evaluation module 206 can apply the trained machine learning model to predict qualitative ratings associated with an advertisement. For example, a representation of an advertisement can be provided to the trained machine learning model, and the trained machine learning model can output values for one or more qualitative ratings for the advertisement. The trained machine learning model can output a value for each qualitative rating. For instance, for each advertisement, the trained machine learning model can output a value for the noticeability qualitative rating, a value for the focal point qualitative rating, a value for the interesting information qualitative rating, a value for the emotional reward qualitative rating, and a value for the CTA qualitative rating. A value for a qualitative rating can indicate a degree or extent of a characteristic associated with the qualitative rating. In some embodiments, a value can be selected from a range of values. For example, a value can be assigned on a scale of 0 to 1, on a scale of 1 to 10, etc. In other embodiments, a value can be selected from a set of options (e.g., high, medium, low, etc.). In certain embodiments, values for different qualitative ratings can be normalized such that the values can be compared across qualitative ratings.

In some embodiments, a machine learning model can be trained for a particular entity associated with advertisements. For example, various entities can generate advertisements, and a particular entity may request qualitative ratings for advertisements generated by the entity. In some embodiments, the machine learning training module 204 can train a machine learning model to predict qualitative ratings for the entity. In these embodiments, advertisements generated by the entity can be excluded or held out from training data for training the machine learning model. For example, the training data can include representations of advertisements generated by all entities other than the entity and associated qualitative ratings. Then, the machine learning evaluation module 206 can determine qualitative ratings for advertisements generated by the entity based on the trained machine learning model. Accordingly, in these embodiments, a machine learning model can be trained for each unique entity associated with advertisements. Examples of entities can include organizations (e.g., companies, businesses, etc.), brands, logos, etc.

Qualitative ratings for advertisements can have various applications. For example, qualitative ratings can be used to compare advertisements. In some embodiments, visually similar advertisements can be identified, and advertisements with low values for qualitative ratings can be compared to advertisements with high values for qualitative ratings to determine differences between the advertisements. For example, two visually similar advertisements can be similar in many aspects in terms of visual content, but there can be differences between the two advertisements. For example, one advertisement may include one or more objects that the other advertisement does not include. Such differences can be used to provide suggestions for improving advertisements. In certain embodiments, suggestions for improving advertisements with low values for qualitative ratings can be provided. In some embodiments, a value for a qualitative rating can be determined to be low or high when the value satisfies a threshold value, a threshold range, etc. All examples herein are provided for illustrative purposes, and there can be many variations and other possibilities.

Figure 3:
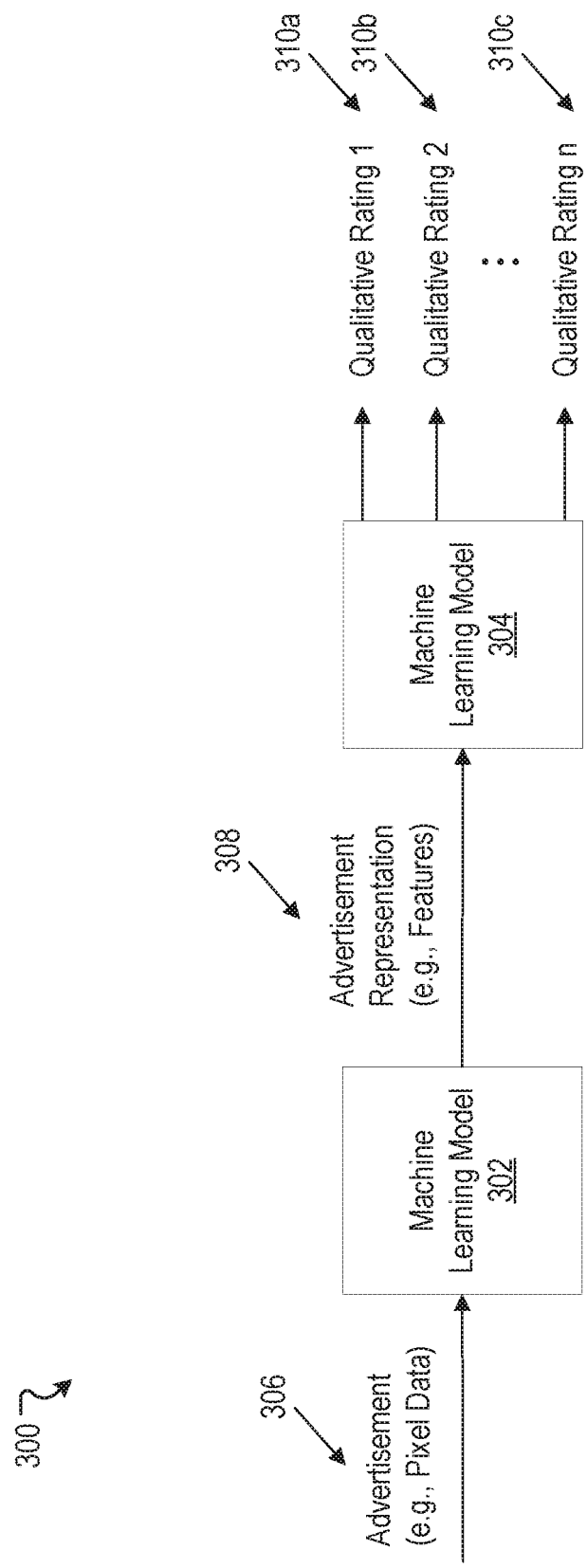
FIG. 3 illustrates an example scenario for determining qualitative ratings for advertisements, according to an embodiment of the present disclosure.

FIG. 3 illustrates an example scenario 300 for determining qualitative ratings for advertisements, according to an embodiment of the present disclosure. In the example scenario 300, an advertisement 306 is provided to a machine learning model 302. For example, pixel data for the advertisement 306 can be provided to the machine learning model 302. The machine learning model 302 can be trained to determine representations of advertisements. In some embodiments, the machine learning model 302 can be the same as or similar to a machine learning model trained by the advertisement representation module 104, as described above. The machine learning model 302 can determine a representation 308 for the advertisement 306, such as a feature vector. The advertisement representation 308 can be provided to a machine learning model 304. The machine learning model 304 can be trained to determine qualitative ratings for advertisements. In some embodiments, the machine learning model 304 can be the same as or similar to a machine learning model trained by the advertisement qualitative rating prediction module 106, as described above. The machine learning model 304 can determine values for one or more qualitative ratings for the advertisement 306. For example, the machine learning model 304 can receive the advertisement representation 308 as input and generate a value for Qualitative Rating 1 310a, a value for Qualitative Rating 2 310b, a value for Qualitative Rating n 310c, etc. as output. All examples herein are provided for illustrative purposes, and there can be many variations and other possibilities.

Figure 4:
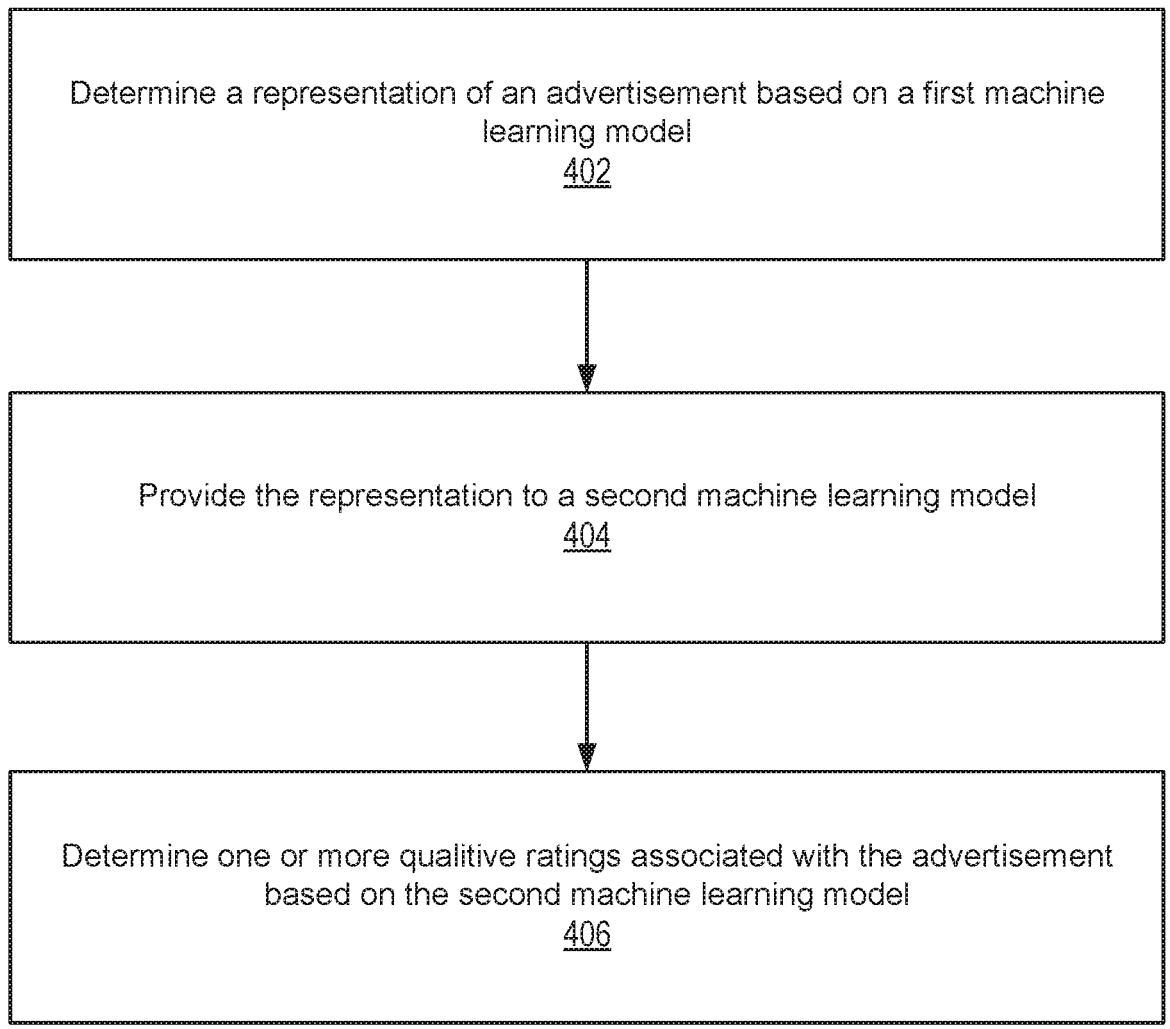
FIG. 4 illustrates an example first method for determining qualitative ratings for advertisements, according to an embodiment of the present disclosure.

FIG. 4 illustrates an example first method 400 for determining qualitative ratings for advertisements, according to an embodiment of the present disclosure. It should be understood that there can be additional, fewer, or alternative steps performed in similar or alternative orders, or in parallel, based on the various features and embodiments discussed herein unless otherwise stated.

At block 402, the example method 400 can determine a representation of an advertisement based on a first machine learning model. At block 404, the example method 400 can provide the representation to a second machine learning model. At block 406, the example method 400 can determine one or more qualitative ratings associated with the advertisement based on the second machine learning model. Other suitable techniques that incorporate various features and embodiments of the present disclosure are possible.

Figure 5:
FIG. 5 illustrates an example second method for determining qualitative ratings for advertisements, according to an embodiment of the present disclosure.

FIG. 5 illustrates an example second method 500 for determining qualitative ratings for advertisements, according to an embodiment of the present disclosure. It should be understood that there can be additional, fewer, or alternative steps performed in similar or alternative orders, or in parallel, based on the various features and embodiments discussed herein unless otherwise stated. Certain steps of the method 500 may be performed in combination with the example method 400 explained above.

At block 502, the example method 500 can train a first machine learning model based on training data including pixel data for a plurality of advertisements and associated representations of the plurality of advertisements. The first machine learning model can be similar to the first machine learning model explained in connection with FIG. 4. At block 504, the example method 500 can train a second machine learning model based on training data including representations of a plurality of advertisements and associated qualitative ratings. The second machine learning model can be similar to the second machine learning model explained in connection with FIG. 4. Other suitable techniques that incorporate various features and embodiments of the present disclosure are possible.

It is contemplated that there can be many other uses, applications, features, possibilities, and/or variations associated with various embodiments of the present disclosure. For example, users can, in some cases, choose whether or not to opt-in to utilize the disclosed technology. The disclosed technology can, for instance, also ensure that various privacy settings, preferences, and configurations are maintained and can prevent private information from being divulged. In another example, various embodiments of the present disclosure can learn, improve, and/or be refined over time.

Social Networking System—Example Implementation

Figure 6:
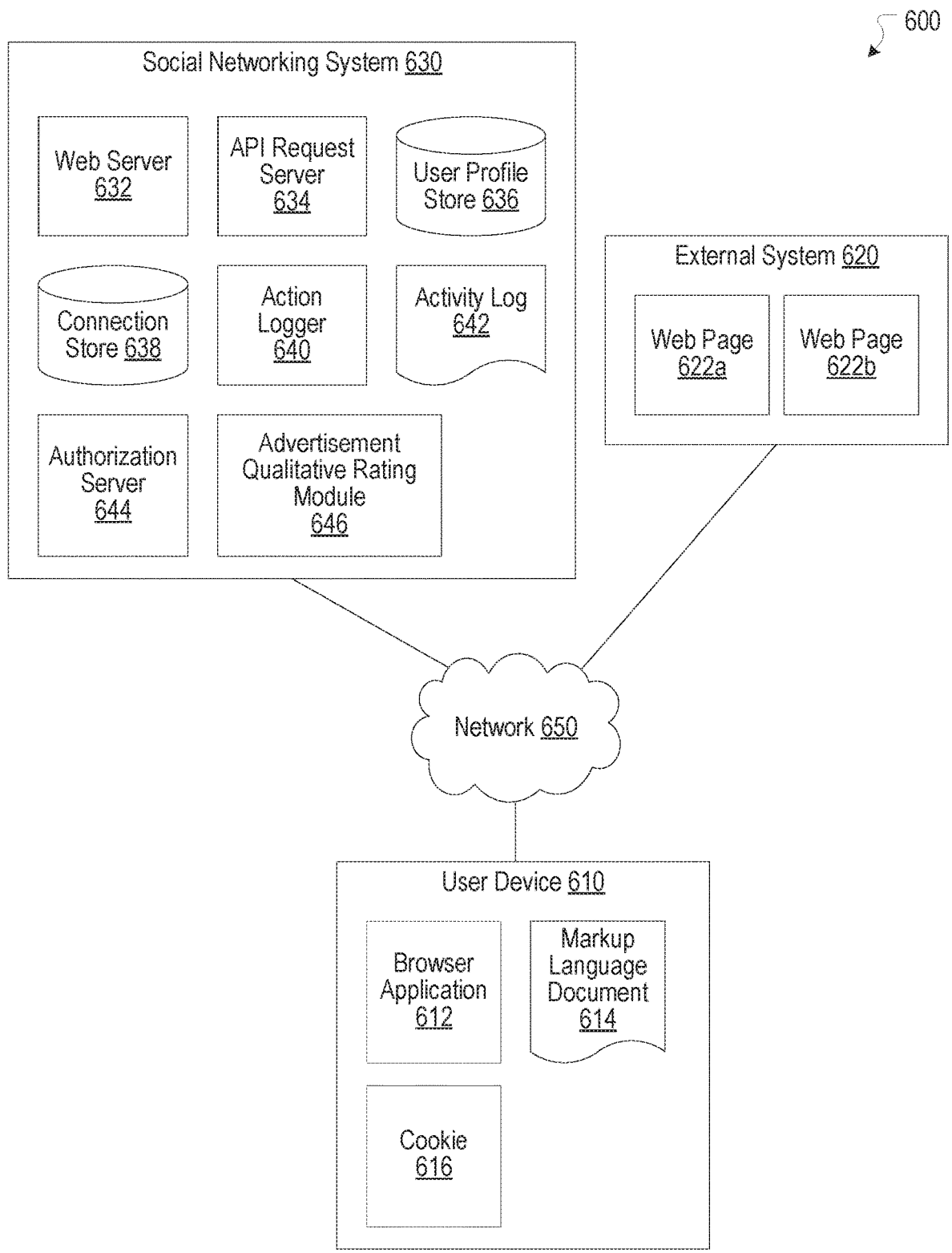
FIG. 6 illustrates a network diagram of an example system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include an advertisement qualitative rating module 646. The advertisement qualitative rating module 646 can be implemented with the advertisement qualitative rating module 102, as discussed in more detail herein. In some embodiments, one or more functionalities of the advertisement qualitative rating module 646 can be implemented in the user device 610.

Hardware Implementation

Figure 7:
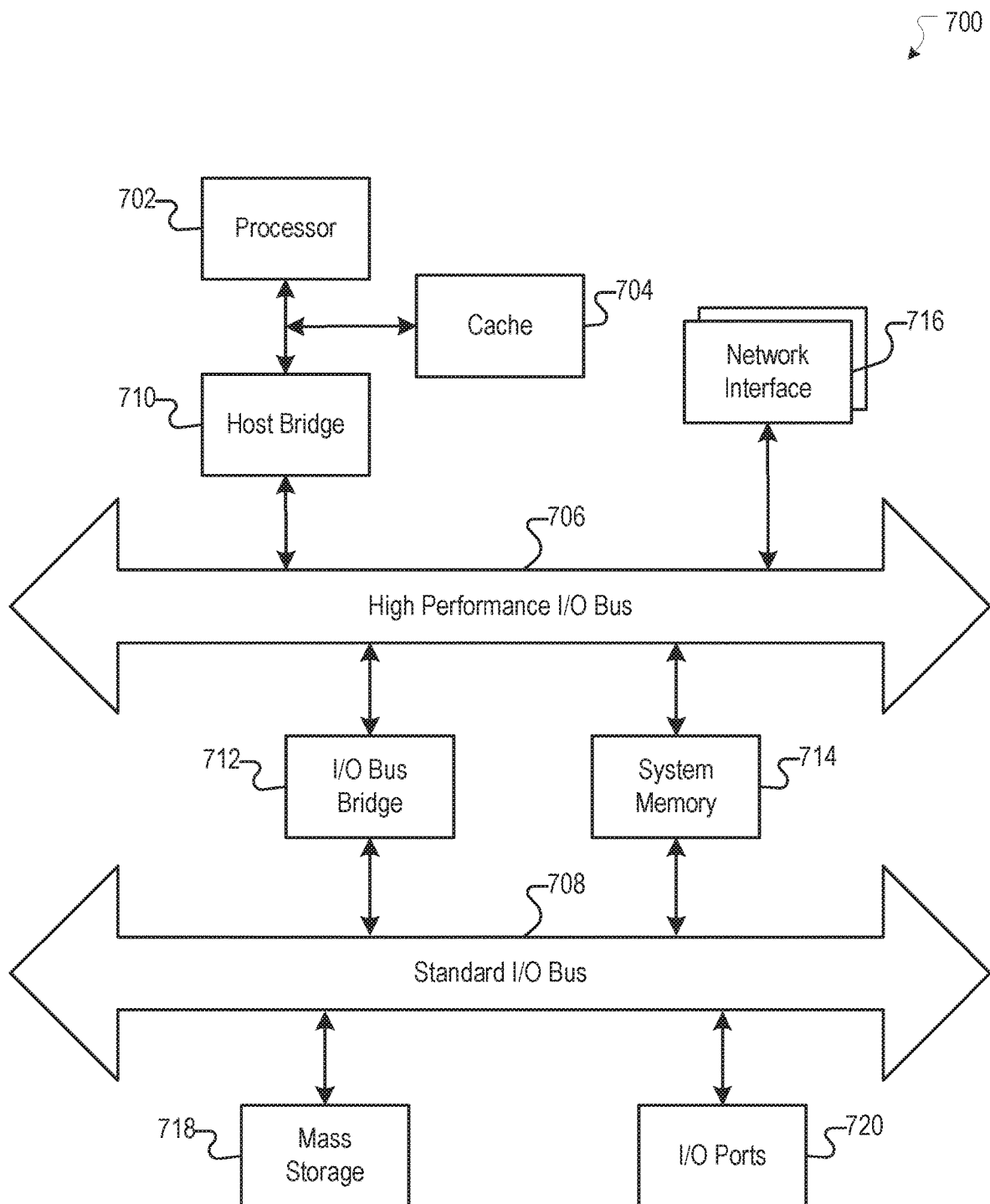
FIG. 7 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing system, a representation of an advertisement based on a first machine learning model, wherein the representation is provided to a second machine learning model;
   providing, by the computing system, the representation to the second machine learning model, wherein the second machine learning model is trained based on training data including representations of a plurality of advertisements and associated qualitative ratings; and
   determining, by the computing system, one or more qualitive ratings associated with the advertisement based on the second machine learning model, wherein the one or more qualitative ratings include a rating associated with a call-to-action (CTA).

2. The computer-implemented method of claim 1, wherein the first machine learning model is a neural network that includes a plurality of layers, and the representation of the advertisement includes a set of features determined based on the neural network.

3. The computer-implemented method of claim 2, wherein the set of features includes an output of each neuron of a fully connected layer of a convolutional neural network.

4. The computer-implemented method of claim 2, wherein each feature of the set of features indicates a likelihood of an attribute being associated with the advertisement.

5. The computer-implemented method of claim 4, wherein the attribute being associated with the advertisement is a visual attribute, the visual attribute including at least one of an object, a concept, a theme, an animal, or a person depicted in the advertisement.

6. The computer-implemented method of claim 4, wherein the attribute being associated with the advertisement is a nonvisual attribute, the nonvisual attribute including metadata information associated with the advertisement.

7. The computer-implemented method of claim 2, wherein the representation of the advertisement is a feature vector including the set of features expressed as values.

8. The computer-implemented method of claim 1, wherein the one or more qualitative ratings is-further include a rating associated with at least one of noticeability, a focal point, interesting information, or an emotional reward.

9. The computer-implemented method of claim 1, wherein a qualitative rating is associated with visual content of an advertisement.

10. The computer-implemented method of claim 1, wherein the second machine learning model is based at least in part on one or more of: a linear regression model, a random forest, or a neural network.

11. The computer-implemented method of claim 1, wherein the determining the representation of the advertisement includes providing pixel data for the advertisement to the first machine learning model as input.

12. The computer-implemented method of claim 1, wherein the first machine learning model is trained based on training data including pixel data for a plurality of advertisements and associated representations of the plurality of advertisements.

13. A system comprising:
    at least one processor; and a memory storing instructions that, when executed by the at least one processor, cause the system to perform:
  determining a representation of an advertisement based on a first machine learning model, wherein the representation is provided to a second machine learning model;
  providing the representation to the second machine learning model, wherein the second machine learning model is trained based on training data including representations of a plurality of advertisements and associated qualitative ratings; and
  determining one or more qualitive ratings associated with the advertisement based on the second machine learning model, wherein the one or more qualitative ratings include a rating associated with a call-to-action (CTA).

14. The system of claim 13, wherein the first machine learning model is a neural network that includes a plurality of layers, and the representation of the advertisement includes a set of features determined based on the neural network.

15. The system of claim 13, wherein the second machine learning model is based at least in part on one or more of: a linear regression model, a random forest, or a neural network.

16. The system of claim 13, wherein the first machine learning model is trained based on training data including pixel data for a plurality of advertisements and associated representations of the plurality of advertisements.

17. A non-transitory computer readable medium including instructions that, when executed by at least one processor of a computing system, cause the computing system to perform a method comprising:
  determining a representation of an advertisement based on a first machine learning model, wherein the representation is provided to a second machine learning model;
  providing the representation to the second machine learning model, wherein the second machine learning model is trained based on training data including representations of a plurality of advertisements and associated qualitative ratings; and
  determining one or more qualitive ratings associated with the advertisement based on the second machine learning model, wherein the one or more qualitative ratings include a rating associated with a call-to-action (CTA).

18. The non-transitory computer readable medium of claim 17, wherein the first machine learning model is a neural network that includes a plurality of layers, and the representation of the advertisement includes a set of features determined based on the neural network.

19. The non-transitory computer readable medium of claim 17, wherein the second machine learning model is based at least in part on one or more of: a linear regression model, a random forest, or a neural network.

20. The non-transitory computer readable medium of claim 17, wherein the first machine learning model is trained based on training data including pixel data for a plurality of advertisements and associated representations of the plurality of advertisements.

* * * * *